United States Patent
Hsu et al.

(10) Patent No.: US 12,449,873 B2
(45) Date of Patent: Oct. 21, 2025

(54) MAINBOARD DEVICE AND UPDATE METHOD OF BASIC INPUT-OUTPUT SYSTEM THEREOF

(71) Applicant: NUVOTON TECHNOLOGY CORPORATION, Hsinchu (TW)

(72) Inventors: Keng Hao Hsu, Hsinchu Science Park (TW); Che Min Liao, Hsinchu Science Park (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 221 days.

(21) Appl. No.: 18/472,816

(22) Filed: Sep. 22, 2023

(65) Prior Publication Data

US 2024/0143053 A1 May 2, 2024

(30) Foreign Application Priority Data

Oct. 28, 2022 (TW) .................................. 111141014

(51) Int. Cl.
 *G06F 1/26* (2006.01)
 *G06F 13/42* (2006.01)
(52) U.S. Cl.
 CPC ............. *G06F 1/266* (2013.01); *G06F 1/263* (2013.01); *G06F 13/4282* (2013.01); *G06F 2213/0042* (2013.01)

(58) Field of Classification Search
 CPC ....................................................... G06F 1/266
 See application file for complete search history.

(56) References Cited

U.S. PATENT DOCUMENTS

| | | | |
|---|---|---|---|
| 9,696,777 B2 * | 7/2017 | Pamley | G06F 13/4221 |
| 2009/0119520 A1 * | 5/2009 | Yoshioka | G06F 1/266 713/300 |
| 2015/0082056 A1 * | 3/2015 | Hsieh | G06F 1/266 713/300 |

* cited by examiner

*Primary Examiner* — Simon P Kanaan
(74) *Attorney, Agent, or Firm* — Snyder, Clark, Lesch & Chung, LLP

(57) ABSTRACT

A mainboard device and an update method of the basic input-output system thereof are provided. The mainboard device includes a flash memory, a universal serial bus (USB) port, and a microprocessor. The code of the basic input-output system is stored in the flash memory. The USB port is connected to an external USB device, wherein the external USB device includes a supply power and stores an update code. The microprocessor includes a power-switching device coupled to the system power and the USB port. When the power-switching device detects that the system power does not provide power and the USB port is provided with the supply power, the microprocessor provides power to the flash memory based on the supply power, and the microprocessor accesses the update code of the external USB device to perform an update operation on the code in the flash memory.

10 Claims, 4 Drawing Sheets

MAINBOARD DEVICE AND UPDATE METHOD OF BASIC INPUT-OUTPUT SYSTEM THEREOF

CROSS-REFERENCE TO RELATED APPLICATION

This application claims priority from Taiwan Patent Application No. 111141014, filed on Oct. 28, 2022, in the Taiwan Intellectual Property Office, the content of which is hereby incorporated by reference in its entirety for all purposes.

BACKGROUND OF THE INVENTION

1. Field of the Invention

The present disclosure relates to a mainboard device and an update method of a basic input-output system (BIOS), particularly to a mainboard device and an update method thereof that can perform the update of the basic input-output system without being provided with system power.

2. Description of the Related Art

With the rapid advancement of information technology, online communication has become more and more popular and convenient. In addition, with the impact of the pandemic, distance learning or telecommuting has become the norm in our daily lives. Whether students or office workers, computers have become one of the essential electronic products for every family. A mainboard is one of the basic devices in either a desktop, laptop, or tablet. The mainboard comes with a basic input-output system serving as the communication interface between the computer hardware and the operating system and reading the code of the basic input-output system in the memory to perform related operations. If an error occurs in the code in the memory or it fails to support peripheral devices, the computer does not work properly.

The computer devices nowadays have allowed users to update or repair the code of the basic input-output system. For example, when the computer is booted up, the code of the basic input-output system is updated by the operating system. If an abnormality occurs, such as damaged code, update failure, or errors to update version, in addition to sending the mainboard for repair and replacing the memory cards for restoration, the update file stored in the external device may also be used to repair the code in the memory.

For instance, by connecting an external storage device to the port of the mainboard, the standby power of the device is provided for the processor to perform the updated code to repair the code in the memory. However, when a problem in the basic input-output system is identified, the computer device often fails to function properly, and the peripherals connected to the mainboard may not function properly as well, making it difficult to ensure that the computer device can provide system power. Under the condition that the operating power cannot be provided, it will be difficult to perform the updating and repairing procedures mentioned above, and it will also be difficult to complete the updating and repairing of the corresponding basic input-output system.

Accordingly, the inventor of the present disclosure has designed a mainboard device and an update method of the basic input-output system thereof in an effort to tackle deficiencies in the prior art and further enhance the implementation and application in industries.

SUMMARY OF THE INVENTION

In view of the problems in prior art, the present disclosure is to provide a mainboard device and an update method of the basic input-output system thereof, with an aim to solving the problem of having difficulty updating or repairing the basic input-output system when the mainboard device is not provided with system power.

Based on the above, the present disclosure provides a mainboard device, including a flash memory, a universal serial bus (USB) port, and a microprocessor. Wherein, the code of the basic input-output system is stored in the flash memory. The USB port is connected to an external USB device, and the external USB device includes a supply power and stores an update code of the basic input-output system. The microprocessor includes a power-switching device coupled to system power and the USB port, wherein when the power-switching device detects that the system power does not provide power and the USB port is provided with the supply power, the microprocessor provides power to the flash memory based on the supply power, and the microprocessor accesses the update code of the external USB device to perform an update operation on the code in the flash memory.

Preferably, the mainboard device may further include an SPI controller coupled to the microprocessor and the flash memory, wherein the microprocessor provides power to the SPI controller and the flash memory to perform an update operation.

Preferably, the SPI controller may be coupled to a chipset, and the chipset may be coupled to a CPU.

Preferably, when the power-switching device detects that the system power provides power, the microprocessor may output a working voltage to the SPI controller and the flash memory based on the system power, so that the CPU may access the code of the basic input-output system through the chipset.

Preferably, the microprocessor may further include a detection unit coupled to the USB port to check a version or security of the update code.

Based on the above, the present disclosure provides an update method of a basic input-output system applied to a mainboard device including a flash memory, a USB port, and a microprocessor, and the update method includes the following steps: disposing a power-switching device of the microprocessor coupled to system power and the USB port; when the power-switching device detects that the system power does not provide power and the USB port is provided with a supply power by an external USB device connected thereto providing power to the flash memory based on the supply power and accessing an update code of the external USB device to perform an update operation on a code of a basic input-output system in the flash memory, by the microprocessor.

Preferably, the mainboard device may include an SPI controller coupled to the microprocessor and the flash memory, and the microprocessor provides power to the SPI controller and the flash memory to perform an update operation.

Preferably, the SPI controller may be coupled to a chipset, and the chipset may be coupled to a CPU.

Preferably, the power-switching device detects that the system power provides power, the microprocessor may output a working voltage to the SPI controller and the flash memory based on the system power, so that the CPU may access the code of the basic input-output system through the chipset.

Preferably, the microprocessor may further include a detection unit coupled to the USB port to check a version or security of the update code.

As mentioned above, the mainboard device and the update method of the basic input-output system thereof according to the present disclosure has one or more the following advantages.

(1) The mainboard device and the update method of the basic input-output system may store the update code of the basic input-output system through an external USB device. The code in the flash memory is maintained and updated through the connection with the USB port. This reduces a waste of hardware cost which requires directly replacing the memory components, and also improves the convenience of performing an update procedure.

(2) The mainboard device and the update method of the basic input-output system may detect the input power through the power-switching device. By using the supply power of the external USB device, the update code of the external USB device may be accessed directly when the system power is not properly provided, thus solving the problem that the mainboard device cannot be updated without system power.

(3) The mainboard device and the update method of the basic input-output system may check the version or security of the update code through the detection unit to confirm the correctness of the update code, thus ensuring that the procedure of the update method may correctly repair or update the basic input-output system.

BRIEF DESCRIPTION OF THE DRAWINGS

To make the technical features, content, and advantages of the present disclosure and the achievable effects more obvious, the present disclosure is described together with the following figures.

DESCRIPTION OF THE PREFERRED
EMBODIMENTS

To illustrate the technical features, contents, advantages, and achievable effects of the present disclosure, the embodiments together with the attached drawings are described in detail as follows. However, the drawings are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure.

Figure 1:
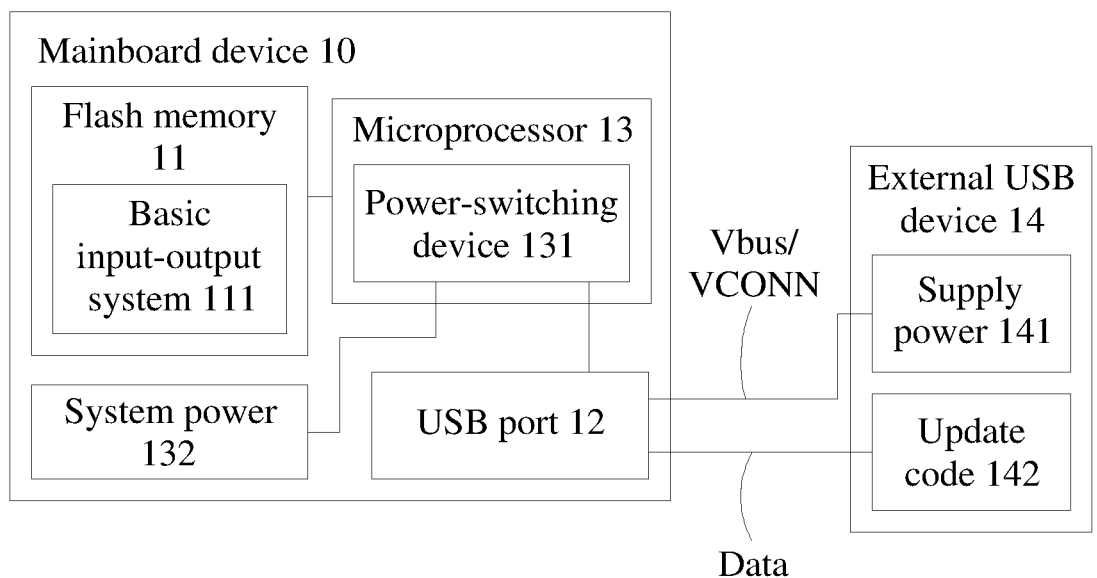
FIG. 1 is a block diagram of the mainboard device according to an embodiment of the present disclosure.

Please refer to FIG. 1. FIG. 1 is a block diagram of the mainboard device according to an embodiment of the present disclosure. As shown in the figure, the mainboard device 10 includes a flash memory 11, a USB port 12, and a microprocessor 13. A code of a basic input-output system 111 is stored in the flash memory 11, and the basic input-output system 111 is used as the communication interface between the hardware equipment of the computer device and the operating system. When the computer device is booted up, the code in the basic input-output system 111 is read to perform the work of system testing and initial setting, allowing the computer device to successfully load the operating system and perform the controlling of the system operation and various peripheral devices. If an error occurs to the code in the basic input-output system 111 or peripheral devices cannot be supported, the computer device may not be able to operate normally.

When an abnormality occurs to the basic input-output system 111, such as damaged code, update failure, errors to update version, and the like, the code of the basic input-output system 111 must be repaired to restore it to a normal state. In the case that the operating system can still be booted up normally, the related code may be updated or repaired from the interface of the system operation; however, in most cases, if an abnormality occurs to the basic input-output system 111, the operating system would be difficult to operate normally; that is, the aforementioned update and repair may not be performed from the surface of the system operation. In this state, in addition to directly replacing the flash memory 11 by a new one, an external USB device 14 may be connected through the USB port 12, to perform a related update operation for updating and fixing the basic input-output system 111 in the flash memory 11.

The external USB device 14 may be connected to the socket of the USB port 12 with the use of the plug of the USB line, so as to perform power and data transmission. Under the structure using USB OTG (On The Go) or USB Type C, a supply power 141 of the external USB device 14 can be provided through the power contact (line) Vbus/VCONN, and an update code 142 stored in the external USB device 14 may be transmitted through the data contact (or line) DATA.

The microprocessor 13 is connected to the flash memory 11 and the USB port 12. The microprocessor 13 includes a power-switching device 131, and the power-switching device 131 is coupled to the system power 132 and the USB port 12. In a normal state, the microprocessor 13 may be powered by the standby power from the system power 132, such as the power provided by a power cable of a computer device or a battery of a mobile device, and the like. However, in the event of a problem with the basic input-output system 111, the system power 132 may not be able to provide power properly. Therefore, when the power-switching device 131 detects that the system power 132 does not provide power and the USB port 12 inputs the supply power 141, the microprocessor 13 provides power to the flash memory based on the supply power. The microprocessor 13 accesses the update code 142 of the external USB device 14 to perform an update operation on a code of the basic input-output system 111 in the flash memory 11. In the present embodiment, even if the microprocessor 13 loses the system power or system standby power and the mainboard device 10 fails to serve as a main control end to control the access to the external USB device 14, but the supply power 141 provided by the external USB device 14 still enables the microprocessor 13 to generate a set of voltages for the update operation to perform the update operation of the access the update code 142, thereby repairing the basic input-output system 111 in the flash memory 11.

The microprocessor 13 may also include a detection unit connected to the USB port 12. When accessing the update code 142 of the external USB device 14, the detection unit may check the version or security (RSA Key, HASH, etc.) of the update code 142. After the confirmation of the status of the update code 142, the code of the basic input-output system 111 is updated or repaired to avoid wrong versions or malicious programs from affecting the operation of the mainboard device 10. When the update or repair of the basic input-output system 111 is completed, the mainboard device 10 is restored to normal operation. The power-switching device 131 detects that the system power 132 provides power properly, and the microprocessor 13 switches to the normal working voltage to power the flash memory 11 based on the system power 132, so as to access the correct code for the basic input-output system 111 to perform a normal boot-up procedure or initialization operation.

Figure 2:
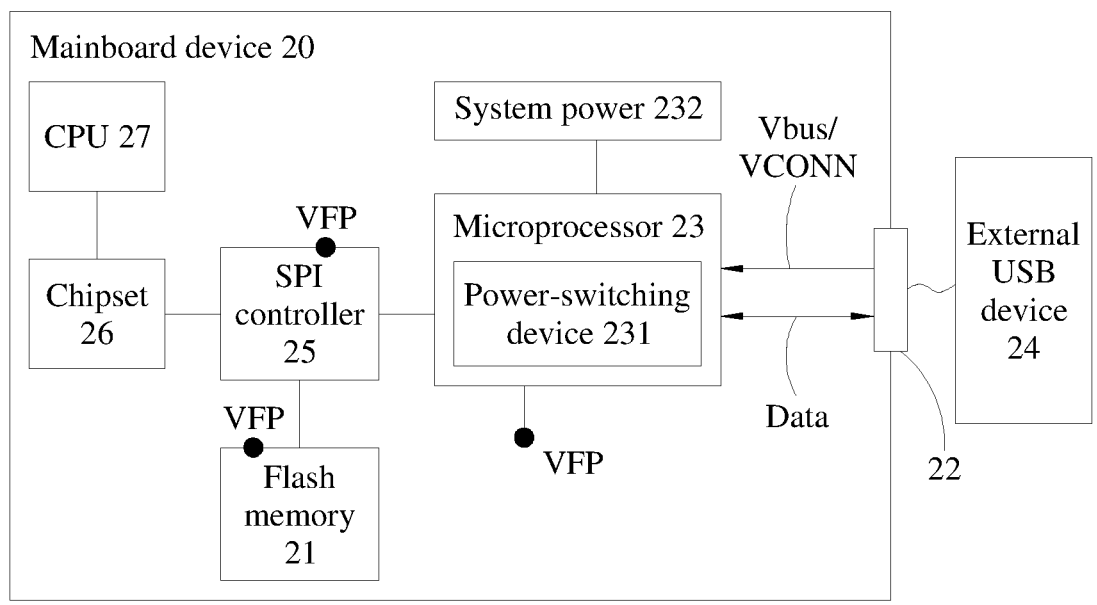
FIG. 2 is a schematic diagram of the mainboard device according to another embodiment of the present disclosure.

Please refer to FIG. 2. FIG. 2 is a schematic diagram of the mainboard device according to another embodiment of the present disclosure. As shown in the figure, the mainboard device 20 includes a flash memory 21, a USB port 22, a microprocessor 23, an external USB device 24, an SPI controller 25, a chipset 26, and a CPU 27. The flash memory 21 stores the code of the basic input-output system, and the USB port 22 is connected to the external USB device 24. The USB port 22 has a power contact Vbus/VCONN and a data contact DATA to receive the supply power from the external USB device 24 and to transmit the update code stored in the external USB device 24.

The microprocessor 23 is connected to the USB port 22, the microprocessor 23 includes a power-switching device 231, and the power-switching device 231 is coupled to the system power 232 and the USB port 22. In a normal state, the microprocessor 23 may be powered by the standby power from the system power 232, such as the power provided by a computer device power line or the battery of a mobile device, and the like. However, in the event of a problem with the basic input-output system, the system power may not be able to provide power properly. When the power-switching device 231 detects that the system power 132 does not provide power and the USB port 22 inputs supply power, the microprocessor 23 provides power to the flash memory 21 based on the supply power. The microprocessor 23 outputs the update voltage VFP to the flash memory 21 and accesses the update code of the external USB device 24 to perform an update operation on the code of the basic input-output system in the flash memory 21. The microprocessor 23 may also be disposed with a detection unit to check the version or security of the update code when accessing the update code to ensure the correctness of the update. In the present embodiment, the update voltage VFP may be the voltage of the supply power. When the system power 232 resumes normal power supply, the update voltage VFP may also be the voltage of the system power 232 (for example, standby voltage) or the converted voltage.

The SPI controller 25 is coupled to the microprocessor 23 and the flash memory 21 through a serial peripheral interface (SPI). When the microprocessor 23 provides power based on the supply power and outputs the update voltage VFP to the SPI controller 25 and the flash memory 21, the microprocessor 23 may be updated by the update voltage VFP. The SPI controller 25 is coupled to the chipset 26, and the chipset 26 is coupled to the CPU 27. When the basic input-output system of the flash memory 21 has been updated or repaired, the system power 232 resumes normal power supply and the power-switching device 231 detects the system power 232 and switches the output to the normal working voltage. That is, the microprocessor 23 converts the update voltage VFP into the voltage provided by the system power 232, which is outputted to the SPI controller 25 and the microprocessor. The CPU 27 accesses the correct code of the basic input-output system in the flash memory 21 by the SPI controller 25 through the chipset 26, in order to perform a normal boot-up procedure or initialization procedure of the mainboard device 20.

Figure 3:
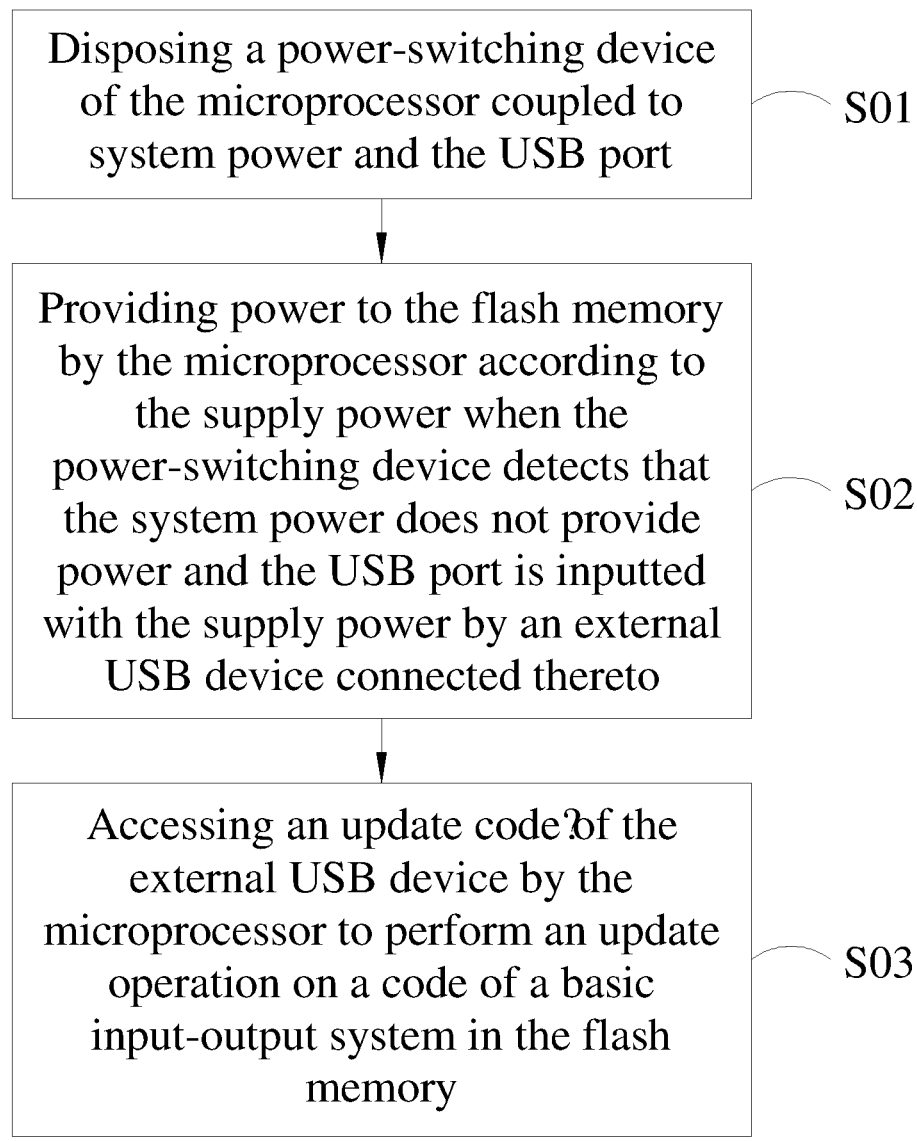
FIG. 3 is a flowchart of the update method of the basic input-output system according to an embodiment of the present disclosure.

Referring to FIG. 3, FIG. 3 is a flowchart of the update method of the basic input-output system according to an embodiment of the present disclosure. The update method of the basic input-output system is applied to a mainboard device, and the mainboard device includes a flash memory, a USB port, and a microprocessor. The configuration of the mainboard device can refer to the aforementioned embodiments. As shown in FIG. 3, the update method of the basic input-output system of the mainboard device includes the following steps (S01-S03).

Step S01: disposing a power-switching device of the microprocessor coupled to system power and the USB port. The flash memory of the mainboard device stores the code of the basic input-output system. The flash memory is connected to the microprocessor, and the power-switching device in the microprocessor is connected to the system power and the USB port. The USB port is connected to an external USB device, and supply power is provided by means of bi-directional power supply of USB OTG or USB Type C. The system power and the supply power are two power inputs of the power-switching device, and the power-switching device may switch the output voltage of the microprocessor through different inputs.

Step S02: providing power to the flash memory by the microprocessor based on the supply power when the power-switching device detects that the system power does not provide power and the USB port is provided with the supply power by an external USB device connected thereto. Continuing from the previous step, when an error occurs in the basic input-output system of the mainboard, which leads to failure to boot up the device or load the operating system normally, the system power fails to provide power correctly, so the power-switching device detect that the system power does not provide power or provides power abnormally; meanwhile, the microprocessor outputs a new set of update voltages to power the flash memory when an external USB device is connected to the USB port, the supply power is provided by the power contact, and the power-switching device switches to its output.

Step S03: accessing an update code of the external USB device by the microprocessor to perform an update operation on a code of the basic input-output system in the flash memory. The update voltage outputted from the microprocessor allows access to the update code stored in the external USB device through the data contact of the USB device. As a result, the code in the flash memory is updated, to make the basic input-output system restored to a normal operation state.

The aforementioned steps allow the mainboard device to be maintained or updated through an external USB device when problems are found in the basic input-output system, thus avoiding the cost of directly replacing hardware. In addition, the power required for the microprocessor to access the code is provided through the supply power of the external USB device, thus avoiding the problem of not being able to perform the update of the code when a problem occurs to the system power.

Figure 4:
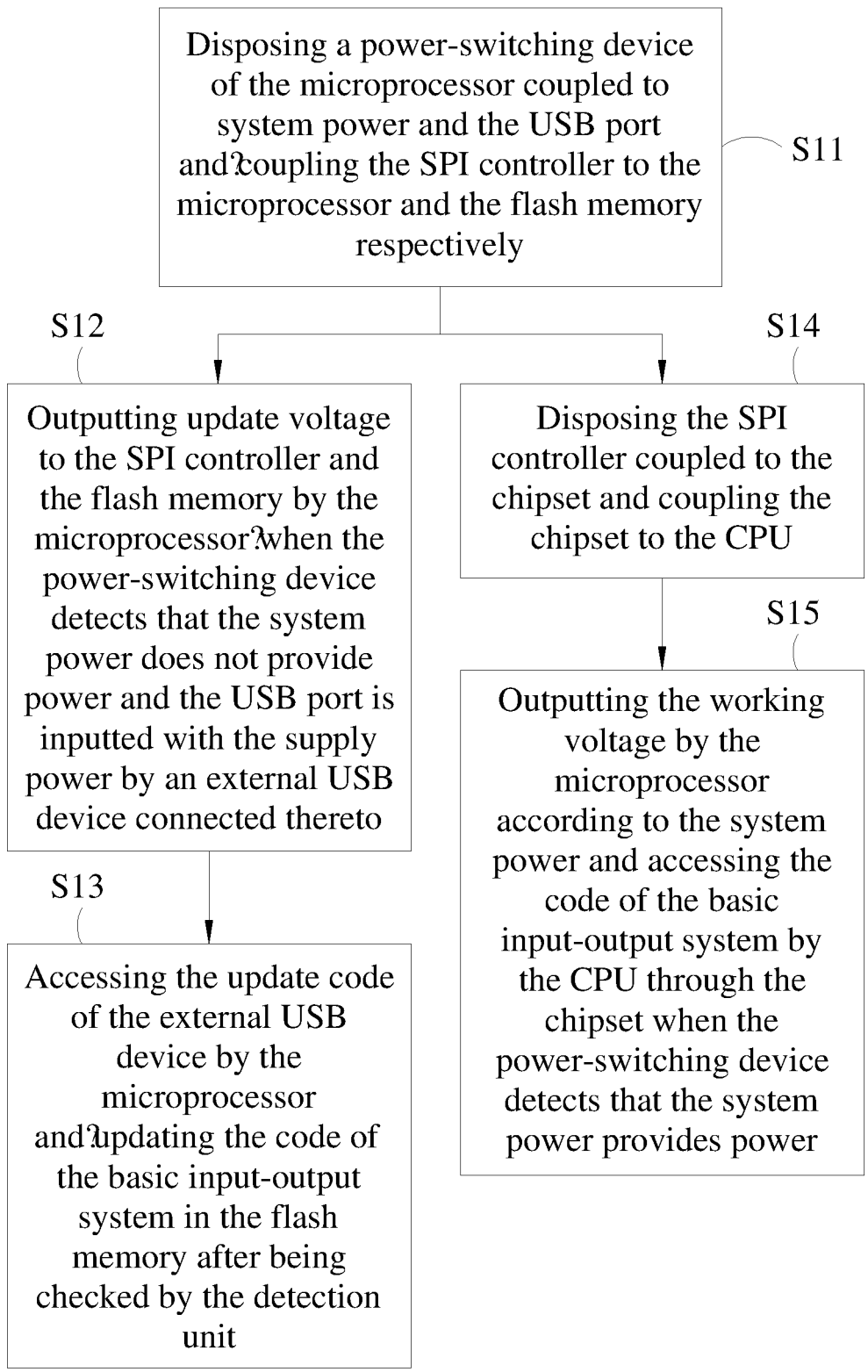
FIG. 4 is a flowchart of the update method of the basic input-output system according to another embodiment of the present disclosure.

Referring to FIG. 4, FIG. 4 is a flowchart of the update method of the basic input-output system according to another embodiment of the present disclosure. The update method of the basic input-output system is applicable to a mainboard device, and the mainboard device includes a flash memory, a USB port, a microprocessor, an external USB device, an SPI controller, a chipset, and a CPU. As shown in the figure, the update method of the basic input-output system of the mainboard device includes the following steps (S11-S15).

Step S11: disposing a power-switching device of the microprocessor coupled to system power and the USB port and coupling the SPI controller to the microprocessor and the flash memory. The flash memory of the mainboard device stores the code of the basic input-output system, the flash memory is connected to the microprocessor through the SPI controller, and the power-switching device in the microprocessor is connected to the system power and the USB port. The USB port is connected to the external USB device, and supply power is provided by means of bi-directional power supply of USB OTG or USB Type C. The system power and the supply power are two power inputs of the power-switching device, and the power-switching device may switch the output voltage of the microprocessor through different inputs.

Step S12: outputting update voltage to the SPI controller and the flash memory by the microprocessor when the power-switching device detects that the system power does not provide power and the USB port is provided with the supply power by an external USB device connected thereto. Continuing from the previous step, when an error occurs in the basic input-output system of the mainboard, which leads to failure to boot up the device or load the operating system normally, the system power cannot provide power correctly, making the power-switching device detect that the system power does not provide power or provides power abnormally. Meanwhile, the microprocessor outputs a new set of update voltages to the SPI controller and flash memory to power the flash memory based on the supply power if an external USB device is connected to the USB port, the supply power is provided by the power contact, and the power-switching device switches to the output.

Step S13: accessing the update code of the external USB device by the microprocessor and updating the code of the basic input-output system in the flash memory after being checked by the detection unit. The update voltage outputted from the microprocessor allows access to the update code stored in the external USB device through the data contact of the USB device. Then, the version or security of the update code is checked by the detection unit in the microprocessor. Finally, the code in the flash memory is updated with the correct update code to make the basic input-output system restored to a normal operation state.

Step S14: disposing the SPI controller coupled to the chipset and coupling the chipset to the CPU. Likewise, in the mainboard device, the SPI controller is coupled to the chipset, the chipset is coupled to the CPU, and the CPU accesses and performs the code stored in the flash memory through the chipset.

Step S15: outputting the working voltage by the microprocessor according to the system power and accessing the code of the basic input-output system by the CPU through the chipset when the power-switching device detects that the system power provides power. If the power-switching device of the microprocessor detects that the system power provides power, the output voltage is switched to the working voltage, allowing the microprocessor to power the serial peripheral interface and the flash memory based on the working voltage. The CPU accesses the code of the basic input-output system in the flash memory by the serial peripheral interface through the chipset, in order to perform a normal boot-up procedure or initialization procedure of the mainboard device 20. In another embodiment, if abnormality still occurs to the basic input-output system, the flash memory may also be powered by the working voltage, and the update code of the external USB device is accessed by the microprocessor, so as to update the code of the flash memory.

The above description is merely illustrative rather than restrictive. Any equivalent modifications or alterations without departing from the spirit and scope of the present disclosure are intended to be included in the following claims.

What is claimed is:

1. A mainboard device, comprising:
    a flash memory, configured to store a code of a basic input-output system;
    a USB port, configured to be connected to an external USB device, wherein the external USB device comprises a supply power and stores an update code of the basic input-output system; and
    a microprocessor, comprising a power-switching device coupled to system power and the USB port, wherein when the power-switching device detects that the system power does not provide power and the USB port is provided with the supply power, the microprocessor provides power to the flash memory based on the supply power, and the microprocessor accesses the update code of the external USB device to perform an update operation on the code in the flash memory.

2. The mainboard device according to claim 1, further comprising:
    an SPI controller, configured to be coupled to the microprocessor and the flash memory, wherein the microprocessor provides power to the SPI controller and the flash memory to perform an update operation.

3. The mainboard device according to claim 2, wherein the SPI controller is coupled to a chipset, and the chipset is coupled to a CPU.

4. The mainboard device according to claim 3, wherein when the power-switching device detects that the system power provides power, the microprocessor outputs a working voltage to the SPI controller and the flash memory based on the system power, so that the CPU accesses the code of the basic input-output system through the chipset.

5. The mainboard device according to claim 1, wherein the microprocessor further comprises a detection unit coupled to the USB port to check a version or security of the update code.

6. An update method of a basic input-output system, applied to a mainboard device comprising a flash memory, a USB port, and a microprocessor, and the update method comprising following steps:
    disposing a power-switching device of the microprocessor coupled to system power and the USB port;
    when the power-switching device detects that the system power does not provide power and the USB port is provided with a supply power by an external USB device connected thereto, providing power to the flash memory based on the supply power and accessing an update code of the external USB device to perform an update operation on a code of a basic input-output system in the flash memory, by the microprocessor.

7. The update method of the basic input-output system according to claim 6, wherein the mainboard device comprises a SPI controller coupled to the microprocessor and the flash memory, and the microprocessor provides power to the SPI controller and the flash memory to perform an update operation.

8. The update method of the basic input-output system according to claim 7, wherein the SPI controller is coupled to a chipset, and the chipset is coupled to a CPU.

9. The update method of the basic input-output system according to claim 8, wherein when the power-switching device detects that the system power provides power, the microprocessor outputs a working voltage to the SPI controller and the flash memory based on the system power, so that the CPU accesses the code of the basic input-output system through the chipset.

10. The update method of the basic input-output system according to claim 6, wherein the microprocessor further comprises a detection unit coupled to the USB port to check the version or security of the update code.

* * * * *